2,921,963

ALKALI METAL BOROHYDRIDE-BORANE COMPLEXES

Evelyn B. Baker, Richard B. Ellis, and William S. Wilcox, Birmingham, Ala., assignors to Callery Chemical Company, Pittsburgh, Pa., a corporation of Pennsylvania No Drawing. Application June 3, 1955
Serial No. 513,141

10 Claims. (Cl. 260—606.5)

This invention relates to alkali metal borohydride-borane complexes and in particular it relates to a new composition of matter having the formula $NaBH_4 \cdot BH_3$ or $NaB_2H_7$.

The chemistry of the alkali metal hydrides and borohydrides in general has developed rapidly in recent years. The first borohydride was reported by Schlesinger in 1939. Methods for the preparation of all the simple alkali metal hydrides and borohydrides having the general formulas $MH$ and $MBH_4$ where $M$ is an alkali metal are now known. Since the borohydride ion is extremely stable, the borohydrides are finding more applications every day in chemical operations. Furthermore, the alkali metal borohydrides are much more soluble in common solvents than are the corresponding hydrides. As a result, the borohydrides are specific reducing agents for a wide variety of organic compounds and are being used quite extensively for research in this field and to a lesser degree for industrial applications. One particular use for which sodium borohydride is admirably suited is as a starting material for the preparation of diborane, $B_2H_6$, and other boron containing compounds. However, none of the alkali metal borohydrides contain as high a percentage of boron as desired for preparative purposes. Therefore, it would be highly beneficial if the bodohydrides as a class could be combined with the less stable borane group, $BH_3$, to provide more boron per mol as well as greater solubility in the solvents used.

It is an object of this invention to provide alkali metal borohydride-borane complexes which are more soluble in common solvents and contain more boron per mol than the brohydrides alone.

Anther object is to provide a method for preparing a solid complex of sodium borohydride and diborane with a polyethylene glycol dialkyl ether suitable for use as a means of transporting diborane in a solid form rather than as a gas.

A still further object is to provide a new and useful composition of matter having the empirical formula $NaB_2H_7$.

Other objects will become apparent as the invention is disclosed throughout the specification and appended claims.

This new composition of matter and method for preparing the same will be more fully described hereinafter and the novelty thereof will be particularly pointed out and distinctly claimed.

This invention is based upon the discovery that whenever a soluble alkali metal borohydride, such as $NaBH_4$, and diborane are brought together in solution in a polyethylene glycol dialkyl ether, a stable complex is formed in the proportion of two molecules of borohydride to one molecule of diborane. These proprtions are represented by the formula $NaBH_4 \cdot BH_3$ or $NaB_2H_7$. This complex has been prepared in solution and in a solid crystalline form containing one molecule of solvent.

In one experiment, the existence of the complex $NaBH_4 \cdot BH_3$ was confirmed by the electrolysis of a solution of sodium borohydride in ethylene glycol dimethyl ether. Diborane was produced at the anode. About half of the total quantity of electricity passed through the cell before appreciable amounts of diborane gas were evolved. Then diborane appeared in greated than Faradaic proportions. Thus, the borohydride ions were discharged to form borane ($BH_3$) molecules which combined immediately with the remaining borohydride ions to form the complex $BH_4 \cdot BH_3^-$ ions. When half of the borohydride had been discharged, the remaining $BH_4^-$ ions were all in the complex form. Subsequent discharge of the complex ions produced twice as much diborane as would come from simple $BH_4^-$ ions.

In another experiment, diborane was bubbled through a solution of 5.25 millimoles of sodium borohydride in 10 millimoles of triethylene glycol dimethyl ether for several hours. Only 2.6 millimoles of diborane were absorbed. This confirmed the formula for the complex formed as $NaBH_4 \cdot BH_3 \cdot 2CH_3(OC_2H_4)_3OCH_3$. By careful evaporation of the solvent, one mol of the ether can be removed leaving a white solid.

The complex $NaBH_4 \cdot BH_3$ forms whenever diborane is bubbled through a solution of sodium borohydride in a polyethylene glycol dialkyl ether such as the dimethyl ether of ethylene glycol, diethylene glycol, triethylene glycol and tetraethylene glycol. This complex also forms when diborane or nascent borane is generated in such solutions of any alkali metal borohydride by any of the known chemical or eletrochemical reactions. The formation of this complex is much more rapid when nascent borane is present such as in the reaction of an alkali metal borohydride with a Lewis acid. The complex $NaBH_4 \cdot BH_3$ has not been isolated as such free of ether but good evidence has been obtained to show that it does exist in solution.

In another experiment, diborane was passed through a solution of sodium borohydride in ethylene glycol dimethyl ether. Diborane was then circulated rapidly over the complex formed to evaporate the excess solvent. The ether vapor was condensed out of the gas stream in a cold trap. In this manner a crystalline solid was obtained which had the composition

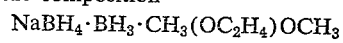
$NaBH_4 \cdot BH_3 \cdot CH_3(OC_2H_4)OCH_3$

Evidence for the existence of the $NaBH_4 \cdot BH_3$ complex is based on several facts: (1) A solution of diethylene glycol dimethyl ether saturated with $NaBH_4$ alone at room temperature contains 5% by weight of $NaBH_4$ but when the same solution is also saturated with diborane it contains 12% by weight of $NaBH_4$. Thus, the complex formed is considerably more soluble than $NaBH_4$. (2) When a $NaBH_4$ solution in diethylene glycol dimethyl ether is saturated with diborane, the electrical conductivity increases by a factor of 10 to 50 over a similar solution saturated with $NaBH_4$ only. This increase is attributed to the formation of the complex. (3) Comparison of infra-red data on a sodium borohydride-triethylene glycol dimethyl ether solution with a similar solution containing the sodium borohydride-borane complex shows that the $NaBH_4$ remains essentially unchanged. However, a new band is observed in the B—H region of the complex which band is not congruous with B—H of $NaBH_4$ or B—H of diborane. $B_2H_6$ is not present as such and no evidence for B—O—C bands can be found. This new band appears as a doublet in the $BH_4$ region which further substantiates the molecular formula for the complex as $NaBH_4 \cdot BH_3$. (4) Chemical analysis of the complex always results in a boron to sodium ratio of 2:1 compared with a 1:1 ratio for $NaBH_4$.

This new composition of matter is useful in that it can be dissolved in polyethylene glycol dialkyl ethers to produce a reducing solution having a hydridic hydrogen content of more than twice that of a solution of $NaBH_4$ in the same ether. When isolated as a solid etherate, the sodium borohydride-borane complex can be used to transport diborane in a convenient manner. Such etherates when heated to 80° C. will regenerate diborane leaving a solution of $NaBH_4$ in the ether used to make the original complex.

While this invention has been described using sodium borohydride as a typical alkali metal borohydride soluble in the polyethylene glycol dialkyl ethers, other experiments with solutions of other soluble alkali metal borohydrides show that the borane complexes of potassium and lithium borohydrides may be prepared in a similar manner. It should therefore be understood that within the scope of the appended claims, this invention may be practiced otherwise than as specifically described.

What is desired to be claimed and secured by United States patent is:

1. A method of preparing a stable alkali metal borohydride-borane complex which comprises reacting diborane with an alkali metal borohydride in a polyethylene glycol dialkyl ether having the formula $$RO(OC_2H_4)_nR$$

where R is a lower alkyl radical and $n$ is a number from 1 to 4 to form in situ a complex having the general formula $MB_2H_7$ where M is an alkali metal.

2. A method according to claim 1 in which the alkali metal borohydride is selected from the class consisting of sodium, potassium and lithium borohydrides.

3. A method according to claim 1 in which the ether used is a polyethylene glycol dimethyl ether having the formula $CH_3(OC_2H_4)_nOCH_3$ where $n$ is an integer from 1 to 4.

4. A method of preparing a solid crystalline sodium borohydride-borane-etherate complex which comprises bubbling diborane through a solution of sodium borohydride in a polyethylene glycol dimethyl ether having the formula $CH_3(OC_2H_4)_nOCH_3$ where $n$ is an integer from 1 to 4, then passing diborane rapidly over the complex formed to evaporate the excess solvent and recovering the complex as a solid residue.

5. A method according to claim 4 in which the ether used is ethylene glycol dimethyl ether and the solid complex obtained has the formula $$NaBH_4 \cdot BH_3 \cdot CH_3(OC_2H_4)OCH_3$$

6. A method according to claim 4 in which the ether used is triethylene glycol dimethyl ether and the solid complex obtained has the formula $$NaBH_4 \cdot BH_3 \cdot CH_3(OC_2H_4)_3OCH_3$$

7. A solution consisting essentially of the borohydride-borane complex having the empirical formula $NaB_2H_7$ in a polyethylene glycol dialkyl ether having the formula $RO(OC_2H_4)_nR$, where R is a lower alkyl radical and $n$ is a number from 1 to 4.

8. The compound having the molecular formula $NaBH_4 \cdot BH_3$ solvated with a polyethylene glycol dialkyl ether having the formula $RO(OC_2H_4)_nR$, where R is a lower alkyl radical and $n$ is a number from 1 to 4.

9. The compound having the molecular formula $NaBH_4 \cdot BH_3 \cdot xCH_3(OC_2H_4)_3OCH_3$ where $x$ is a number from 1 to 2.

10. The compound having the molecular formula $NaBH_4 \cdot BH_3 \cdot xCH_3(OC_2H_4)OCH_3$ where $x$ is a number from 1 to 2.

References Cited in the file of this patent

UNITED STATES PATENTS 2,545,633  Schlesinger et al. _____ Mar. 20, 1951

OTHER REFERENCES

Bulletin 502A on "Sodium Borohydride," pub. by Metal Hydrides, Inc., 12–24 Congress St., Beverly, Mass., and consisting of two (2) pages. Received in U.S. Patent Office, Div. 59, Feb. 15, 1950.